US012742093B2

(12) United States Patent
Shi et al.

(10) Patent No.: US 12,742,093 B2
(45) Date of Patent: Sep. 22, 2026

(54) PHOSPHATE COATING RESISTANT TO 1,800 DEGREES CELSIUS FOR HEAT INSULATION AND FIREPROOFING AND PREPARATION METHOD THEREOF

(71) Applicant: Shanghai Ruoyu New Materials Co., Ltd, Shanghai (CN)

(72) Inventors: Liping Shi, Shanghai (CN); Yunxing Wang, Shanghai (CN); Yuxin Li, Shanghai (CN)

(73) Assignee: SHANGHAI RUOYU NEW MATERIALS CO., LTD, Shanghai (CN)

( * ) Notice: Subject to any disclaimer, the term of this patent is extended or adjusted under 35 U.S.C. 154(b) by 706 days.

(21) Appl. No.: 18/335,563

(22) Filed: Jun. 15, 2023

(65) Prior Publication Data

US 2023/0416564 A1 Dec. 28, 2023

(30) Foreign Application Priority Data

Jun. 23, 2022 (CN) ......................... 202210719561.1

(51) Int. Cl.
*C09D 183/04* (2006.01)
*C08K 13/02* (2006.01)

(52) U.S. Cl.
CPC ............ *C09D 183/04* (2013.01); *C08K 13/02* (2013.01)

(58) Field of Classification Search
CPC .............................. C09D 183/04; C08K 13/02
See application file for complete search history.

(56) References Cited

FOREIGN PATENT DOCUMENTS

CN 112266633 A * 1/2021 ............... C09D 7/61

* cited by examiner

*Primary Examiner* — Robert S Jones, Jr.
*Assistant Examiner* — Elizabeth Amato
(74) *Attorney, Agent, or Firm* — Leong C. Lei

(57) ABSTRACT

A phosphate coating resistant to 1,800 degrees Celsius for heat insulation and fireproofing and a preparation method are provided, belonging to the technical field of phosphate coating for thermal insulation and fire protection. The phosphate coating for heat insulation and fireproofing includes aluminum dihydrogen phosphate, zinc oxide, cerium oxide, gadolinium zirconate, polysiloxane, zirconium boride, hafnium carbide, pickaxeum powder, tungsten powder, chopped high-silica fibers, chromium trioxide, potassium chromate, non-silica defoamer and deionized water, and the preparation method includes weighing, ball milling, sieving, stirring, and heating to a gel state.

3 Claims, 3 Drawing Sheets

PHOSPHATE COATING RESISTANT TO 1,800 DEGREES CELSIUS FOR HEAT INSULATION AND FIREPROOFING AND PREPARATION METHOD THEREOF

CROSS-REFERENCE TO RELATED APPLICATIONS

This application claims priority to Chinese Patent Application No. 202210719561.1, filed on Jun. 23, 2022, the contents of which are hereby incorporated by reference.

TECHNICAL FIELD

The present application belongs to the technical field of phosphate coating for thermal insulation and fire protection.

BACKGROUND

Fireproof coating is a kind of coating with a special function of insulating heat and flame after sprayed onto the surface of the material, enhancing the thermal insulation performance of the protected material and preventing the structure of the protected material from being damaged. According to the composition of the base material, fireproof coatings are classified into inorganic fireproof coating and organic fireproof coating, among which inorganic fireproof coating uses inorganic substances, such as silicate and phosphate, as binder and has low prices.

Phosphate coating is a non-toxic inorganic coating resistant to high temperature oxidation, corrosion and abrasion, it is a gray viscous liquid with good physical properties, high viscosity and good adhesion ability, mainly made of aqueous solution of phosphate, curing agent and reactive filler, etc. In comparison to silicone and metal coatings, phosphate coatings are easy to prepare, cost-effective with better performance, and are durable enough to withstand long-term storage. After coating and curing, phosphate coatings form a coating resistant to high temperatures on the surface of the material, capable of withstanding high-temperature airflow up to 650 degrees Celsius (° C.).

Patent CN112266633A discloses a fireproof coating resistant to high temperatures up to 1,700° C. and preparation method thereof, which adopts aluminum hydroxide, silicon dioxide, mica powder, magnesium oxide, double-rare-earth tantalate and basalt fibers to prepare and obtain a fireproof coating capable of standing for 20 minutes (min) at 1,700° C., which effectively pioneered the technical field of high-temperature resistant coatings in China. However, the heat-resistant temperature of existing phosphate coatings remains not higher than 1,700° C., and the existing phosphate coatings are hardly able to achieve the full temperature cycle of temperature resistance. Most of the high-temperature fireproof coatings swell to impair the mechanical properties, and have the disadvantages of a large using thickness, easy peeling off, and weak binding strength.

SUMMARY

The present application solves the technical problems that the heat-resistant temperature of existing phosphate coatings is still no higher than 1700 degrees Celsius (° C.), and it is difficult to achieve the temperature resistance of the full temperature cycle, as well as the problems of swelling, big thickness of use, easy peeling off, and weak binding strength, and provides a phosphate coating resistant to 1,800° C. for heat insulation and fireproofing and its preparation method.

A phosphate coating resistant to 1,800° C. for heat insulation and fireproofing, including, in parts by mass, 20-30 parts of aluminum dihydrogen phosphate, 10-20 parts of zinc oxide, 10-20 parts of cerium oxide, 5-15 parts of gadolinium zirconate, 5-15 parts of polysiloxane, 3-10 parts of zirconium boride, 3-10 parts of hafnium carbide, 3-5 parts of pickaxeum powder, 3-5 parts of tungsten powder, 10-15 parts of chopped high-silica fibers, 3-10 parts of chromium trioxide, 3-10 parts of potassium chromate, 0.4-1 part of non-silicone defoamer and 5-15 parts of deionized water.

The present application provides a preparation method of the phosphate coating resistant to 1,800° C. for heat insulation and fireproofing, including the following steps:

- step 1, in parts by mass, weighing 20-30 parts of aluminum dihydrogen phosphate, 10-20 parts of zinc oxide, 10-20 parts of cerium oxide, 5-15 parts of gadolinium zirconate, 5-15 parts of polysiloxane, 3-10 parts of zirconium boride, 3-10 parts of hafnium carbide, 3-5 parts of pickaxeum powder, 3-5 parts of tungsten powder, 10-15 parts of chopped high-silica fibers, 3-10 parts of chromium trioxide, 3-10 parts of potassium chromate, 0.4-1 part of non-silicone defoamer, and 5-15 parts of deionized water;
- step 2, using anhydrous ethanol as a medium, performing ball milling to the aluminum dihydrogen phosphate, zinc oxide, cerium oxide, gadolinium zirconate, polysiloxane, zirconium boride, hafnium carbide, pickaxeum powder, tungsten powder, chromium trioxide and potassium chromate with a ball mill, followed by drying and sieving to obtain sieved powder; and
- step 3, adding the sieved powder and the chopped high-silica fibers into deionized water under conditions of water bath and stirring, followed by adding the non-silicone defoamer, and stifling and heating to a gel state to obtain the phosphate coating resistant to 1,800° C. for heat insulation and fireproofing.

The present application achieves the following beneficial effects:

- the overall process of the present application is simple by using ball mill treatment, the particles of raw materials are in uniform size distribution after drying and sieving, which therefore makes the reaction between raw materials more complete, and the composition of the obtained coating more balanced; by using water bath to control the temperature, the materials are fully reacted without boiling, so that the reaction is not difficult to control;
- the phosphate coating prepared by the present application has low thermal conductivity of 0.162 watts per meter kelvin ($W \cdot (m \cdot K)^{-1}$), a high melting point, good thermal insulation properties, and may achieve full cycle temperature resistance from low to high temperatures, with the high temperature up to 1,800° C.; there is no swelling during the whole process, and the base material is well protected against fire; and
- the phosphate fireproof coating prepared by this application allows cold spraying under room temperature conditions and curing at room temperatures, with a thin usage thickness (3 millimeters, mm), and the formed phosphate fireproof coating layer has strong toughness and adhesion (above 3 megapascals, MPa), contributing to a further breakthrough in phosphate coating for thermal insulation and fireproofing.

DETAILED DESCRIPTION OF THE EMBODIMENTS

Specific Embodiment 1

Figure 1:
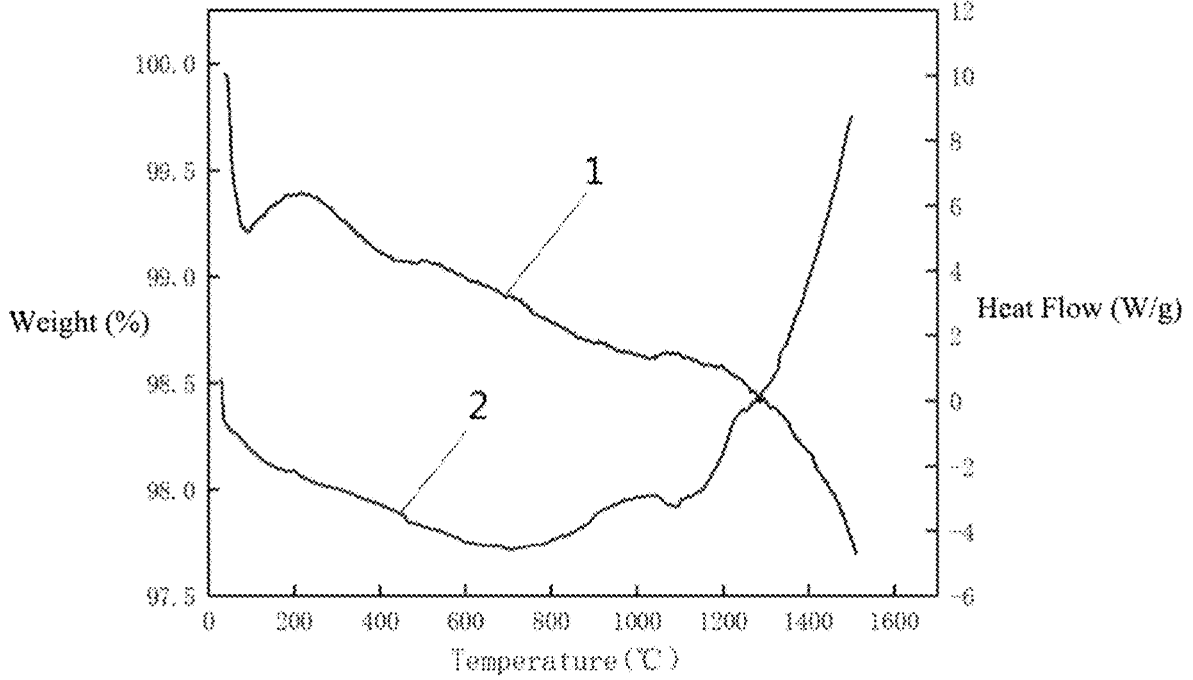
FIG. 1 shows thermogravimetric analysis-differential scanning calorimetry (Tg-DSC) curves of a phosphate coating resistant to 1,800 degrees Celsius (° C.) for heat insulation and fireproofing prepared in Embodiment 1 in response to temperature changes, where 1 is the Tg curve and 2 is the DSC curve.

The present embodiment provides a phosphate coating resistant to 1,800 degrees Celsius (° C.) for heat insulation and fireproofing, including: in parts by mass, 20-30 parts of aluminum dihydrogen phosphate, 10-20 parts of zinc oxide, 10-20 parts of cerium oxide, 5-15 parts of gadolinium zirconate, 5-15 parts of polysiloxane, 3-10 parts of zirconium boride, 3-10 parts of hafnium carbide, 3-5 parts of pickaxeum powder, 3-5 parts of tungsten powder, 10-15 parts of short-cut high-silica oxygen fiber, 3-10 parts of chromium trioxide, 3-10 parts of potassium chromate, 0.4-1 part of non-silicone defoamer, and 5-15 parts of deionized water.

Principle: the phosphate coating resistant to 1,800° C. for heat insulation and fireproofing provided by the present embodiment is mainly composed of phosphate base material, reactive pigments and functional fillers, in which the phosphate base material is composed of aluminum dihydrogen phosphate, zinc oxide and cerium oxide, the reactive pigments include gadolinium zirconate and polysiloxane, and the functional fillers include zirconium boride, hafnium carbide, pickaxeum powder, tungsten powder and chopped high-silica fibers; chromium trioxide and potassium chromate are used as corrosion inhibitors, and non-silicone defoamer is used for defoaming.

Beneficial effects: the phosphate base material serves as a bonding material while providing properties of fire resistance; zinc oxide and cerium oxide as curing agents are capable of absorbing the water generated during the chemical reaction so as to prevent the overflow of generated water and slow down the acidity of the substrate, as well as lowering the curing temperature for mass construction at room temperatures;

gadolinium zirconate and polysiloxane provide certain curing effects, reduce the baking temperature, and keep the system stable by enabling heat resistance;

zirconium boride and hafnium carbide with high melting points as high-temperature resistant fillers provide excellent high-temperature resistance property, and the volume shrinkage between the coating and the substrate caused by the difference in thermal expansion coefficients and chemical effects is reduced, which prevents internal stress in the coating from causing the coating to crack and improves the durability and adhesion of the phosphate base material;

metal pickaxeum as well as tungsten powder allows the formation of molten coatings under different temperatures, making the thermal expansion coefficient of the coating further close to that of the base material and meeting the performance requirements of the high temperature range of 1,800° C.;

the added chopped high-silica fibers are capable of uniformly dispersing in the coating, generating resistance to air, and the vertical arrangement in the direction of heat transfer effectively prevents the transfer and loss of heat;

chromium trioxide and potassium chromate as corrosion inhibitors regulate the acidity of the phosphate base material, ensuring that the coating is less corrosive to the substrate and capable of forming a continuous film to obtain the desired coating;

the defoamer reduces the air bubbles generated during the preparation of raw materials, making the coating more uniform and ensuring a flat appearance and better adhesion of the coating;

the raw materials under the described ratio provide the coating with optimal fire insulation effects and effectively increase the heat-resistant temperature of the fireproof coating; when the substrate surface coated with the phosphate coating is in the environment of high temperatures, the positive metal ions in the coating increase in large quantities, the acidic phosphate and metal powder react to produce neutral insoluble phosphate, at which time the dihydrogen phosphate salt changes to a normal salt of monohydrogen phosphate, while the dehydrated phosphate is heated to produce cross-linked polymerization, forming a complex network of molecular chains, and the inorganic compound and the substrate is firmly bonded by a protective film.

The beneficial effects of this embodiment are as follows:

the overall process of the present embodiment is simple by using ball mill treatment, the particles of raw materials are in uniform size distribution after drying and sieving, which can make the reaction between raw materials more complete, the composition of the obtained coating more balanced, and the composition of the obtained coating more balanced; by using water bath to control the temperature, the materials are fully reacted without boiling, so that the reaction is not difficult to control;

the phosphate coating prepared by the present embodiment has low thermal conductivity of 0.162 watts per meter kelvin ($W \cdot (m \cdot K)^{-1}$), a high melting point, good thermal insulation properties, and achieves full cycle temperature resistance from low to high temperatures up to 1,800° C.; there is no expansion during the whole process, and the base material is well protected against fire; and the phosphate fireproof coating prepared by this application allows cold spraying and curing at room temperatures, with a small usage thickness (3 millimeters, mm), and the formed phosphate fireproof coating layer has strong toughness and adhesion (above 3 megapascals, MPa), contributing to a further breakthrough in phosphate coating for thermal insulation and fireproofing.

Specific Embodiment 2

Different from Specific embodiment 1, the present specific embodiment includes, in parts by mass, 20-25 parts of aluminum dihydrogen phosphate, 10-15 parts of zinc oxide, 10-15 parts of cerium oxide, 5-10 parts of gadolinium zirconate, 5-10 parts of polysiloxane, 3-5 parts of zirconium boride, 3-5 parts of hafnium carbide, 3-4 parts of pickaxeum powder, 3-4 parts of tungsten powder, 10-13 parts of short-cut high-silica oxygen fiber, 3-5 parts of chromium trioxide, 3-5 parts of potassium chromate, 0.4-0.5 part of non-silicone defoamer and 5-10 parts of deionized water. Others are the same as the Specific embodiment 1.

Specific Embodiment 3

This specific embodiment is different from Specific embodiment 1 or Specific embodiment 2 in that the non-silicone defoamer used in the present specific embodiment is BYK-A550, BYK-A555, BYK024 or BYK053N. Others are the same as the Specific embodiments 1 or Specific embodiment 2.

Specific Embodiment 4

Figure 3:
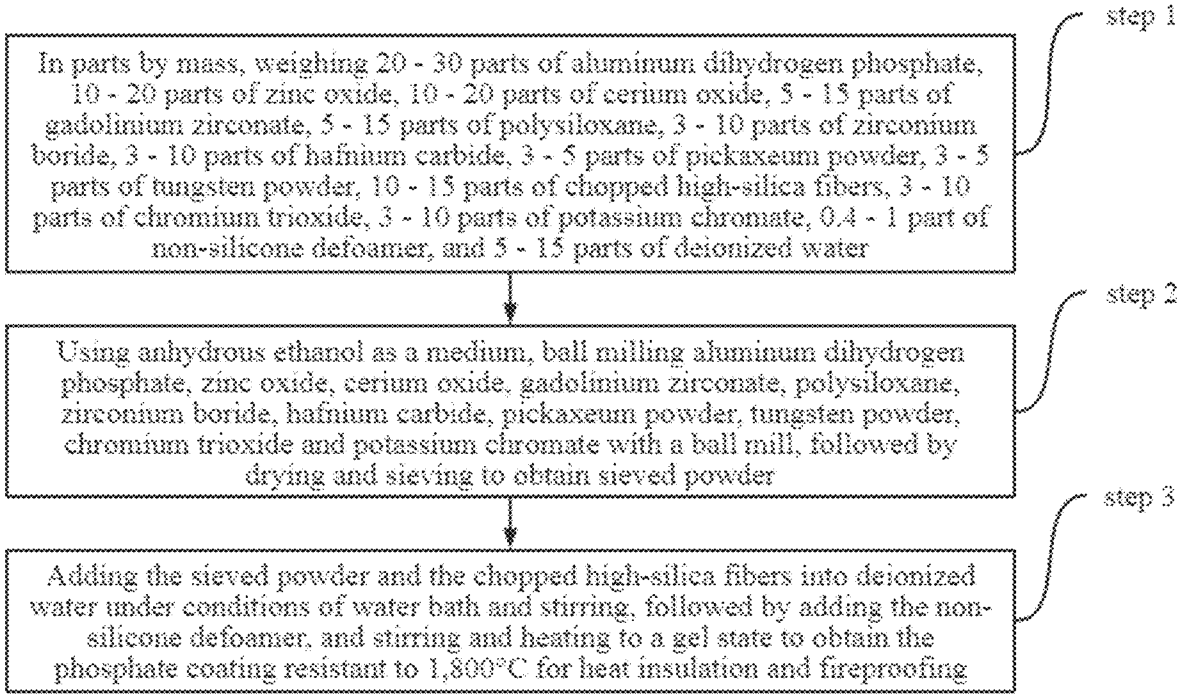
FIG. 3 shows a process of preparing the phosphate coating resistant to 1,800° C. for heat insulation and fireproofing according to the present application.

The present specific embodiment provides a preparation method of the phosphate coating resistant to 1,800° C. for heat insulation and fireproofing, including the following steps as shown in FIG. 3:

- step 1, in parts by mass, weighing 20-30 parts of aluminum dihydrogen phosphate, 10-20 parts of zinc oxide, 10-20 parts of cerium oxide, 5-15 parts of gadolinium zirconate, 5-15 parts of polysiloxane, 3-10 parts of zirconium boride, 3-10 parts of hafnium carbide, 3-5 parts of pickaxeum powder, 3-5 parts of tungsten powder, 10-15 parts of chopped high-silica fibers, 3-10 parts of chromium trioxide, 3-10 parts of potassium chromate, 0.4-1 part of non-silicone defoamer, and 5-15 parts of deionized water;
- step 2, using anhydrous ethanol as a medium, ball milling aluminum dihydrogen phosphate, zinc oxide, cerium oxide, gadolinium zirconate, polysiloxane, zirconium boride, hafnium carbide, pickaxeum powder, tungsten powder, chromium trioxide and potassium chromate with a ball mill, followed by drying and sieving to obtain sieved powder; and
- step 3, adding the sieved powder and the chopped high-silica fibers into deionized water under conditions of water bath and stirring, followed by adding the non-silicone defoamer, and stifling and heating to a gel state to obtain the phosphate coating resistant to 1,800° C. for heat insulation and fireproofing.

Specific Embodiment 5

This specific embodiment is different from Specific embodiment 4 in that the non-silicone defoamer used in step 1 is BYK-A550, BYK-A555, BYK024 or BYK053N. Others are the same as those in Specific embodiment 4.

Specific Embodiment 6

This specific embodiment is different from Specific embodiment 4 or Specific embodiment 5 in that the ball milling in step 2 of the present embodiment is ball milling for a duration of 500-1,200 min at a rotating speed of 300-600 revolutions per minutes (r/min); others are the same as those in Specific embodiment 4 or 5.

Specific Embodiment 7

This specific embodiment is different from any one of Specific embodiments 4 to 6 in that the drying in the step 2 specifically includes drying under a temperature of 55-85° C. for a duration of 8-24 hours (h), and others are the same as those in Specific embodiments 4 to 6.

Specific Embodiment 8

This specific embodiment is different from any one of Embodiments 4 to 7 in that the sieving in the step 2 specifically includes sieving powders through a 300-500 mesh sieve; and others are the same as those in Specific embodiments 4 to 7.

Specific Embodiment 9

This specific embodiment is different from any one of Specific embodiment 4 to Specific embodiment 8 in that the water bath in the step 3 is carried out at a temperature of 85-95° C., and others are the same as those in Specific embodiments 4 to 8.

Specific Embodiment 10

This specific embodiment is different from any one of Specific embodiments 4 to 9 in that a stirring speed of the stirring in the step 3 is 450 r/min-750 r/min. Others are the same as those in Specific embodiments 4 to 9.

The following embodiments are adopted to verify the beneficial effects of the present application.

Embodiment 1

The preparation method of the phosphate coating resistant to 1,800° C. for heat insulation and fireproofing provided by the present embodiment includes the following steps:

- step 1, in parts by mass, weighing 20 parts of aluminum dihydrogen phosphate, 10 parts of zinc oxide, 10 parts of cerium oxide, 5 parts of gadolinium zirconate, 5 parts of polysiloxane, 5 parts of zirconium boride, 5 parts of hafnium carbide, 3 parts of pickaxeum powder, 3 parts of tungsten powder, 10 parts of chopped high-silica fibers, 5 parts of chromium trioxide, 5 parts of potassium chromate, 0.5 part of non-silicone defoamer, and 10 parts of deionized water;
- the non-silicon defoamer is BYK-A550, and the chopped high-silica fibers is in a length of 2 mm and a diameter of 8-12 micrometers (μm);
- step 2, using anhydrous ethanol as a medium, ball milling aluminum dihydrogen phosphate, zinc oxide, cerium oxide, gadolinium zirconate, polysiloxane, zirconium boride, hafnium carbide, pickaxeum powder, tungsten powder, chromium trioxide and potassium chromate with a ball mill, followed by drying and sieving to obtain sieved powder; and
- step 3, adding the sieved powder and the chopped high-silica fibers into deionized water under conditions of a water bath at 85° C. and stirring at a stirring speed of 500 r/min, followed by adding the non-silicone defoamer, and stirring and heating to a gel state to obtain the phosphate coating resistant to 1,800° C. for heat insulation and fireproofing.

The ball milling in the step 2 specifically includes ball milling for a duration of 600 min at a rotating speed of 500 r/min.

The drying in the step 2 specifically is drying for 10 h at a temperature of 70° C.

The sieving in the step 2 specifically is sieving powders through a 300-mesh sieve.

The phosphate coating resistant to 1,800° C. for heat insulation and fireproofing prepared in the Embodiment 1 is sprayed onto a steel plate of 150 mm×70 mm with a thickness of 3 mm, followed by curing under a room temperature for 3 days to completely cure the resin to obtaining the steel plate sprayed with the coating of heat insulation and fireproofing.

The coating of heat insulation and fireproofing is tested in terms of adhesion on the steel plate using a PosiTest adhesion tester in accordance with the standard of CB/T 5210-2006, and the adhesion is measured to be 3.2 MPa, indicating that the adhesion of the coating of heat insulation and fireproofing is excellent.

The steel plate coated with the coating of heat insulation and fireproofing is tested for back surface temperature during combustion. The test specimen is first fixed on a support, and then subjected to flame burning with a flame gun, and the back surface temperature is recorded with a thermocouple on the other side of the test specimen. It is found through the flame burning test that the test specimen performs well during the combustion process, no expansion phenomenon occurs, and the temperature of the back surface of the test specimen does not exceed 200° C. when the temperature of the front surface has risen to 1,800° C., indicating that the fireproofing coating is fire-resistant in the full cycle of the temperature cycle of rising to 1,800° C. and keeps the state for 10 min at 1,800° C. The heat insulation and fireproofing performance is obvious.

The thermal conductivity of the steel plate coated with the coating of heat insulation and fireproofing is tested at room temperatures using the laser method with a pulse of 0.3 millisecond (ms), and the result is 0.162 $W\cdot(m\cdot K)^{-1}$.

A part of the fireproof coating on the steel plate is cut off with a knife to make a powder sample, and then subjected to Tg-DSC test in air atmosphere with temperature rising to 1,500° C. in a heating rate of 10° C./min. The thermogravimetric analysis-differential scanning calorimetry (Tg-DSC) curve of the phosphate coating resistant to 1,800° C. for heat insulation and fireproofing prepared in Embodiment 1 in response to temperature changes is shown in FIG. 1, where 1 is the Tg curve and 2 is the DSC curve; as can be seen from the drawing, the weight loss of the sample after heating up to 1,500° C. is less than 3%, suggesting an excellent thermal resistance performance.

Figure 2:
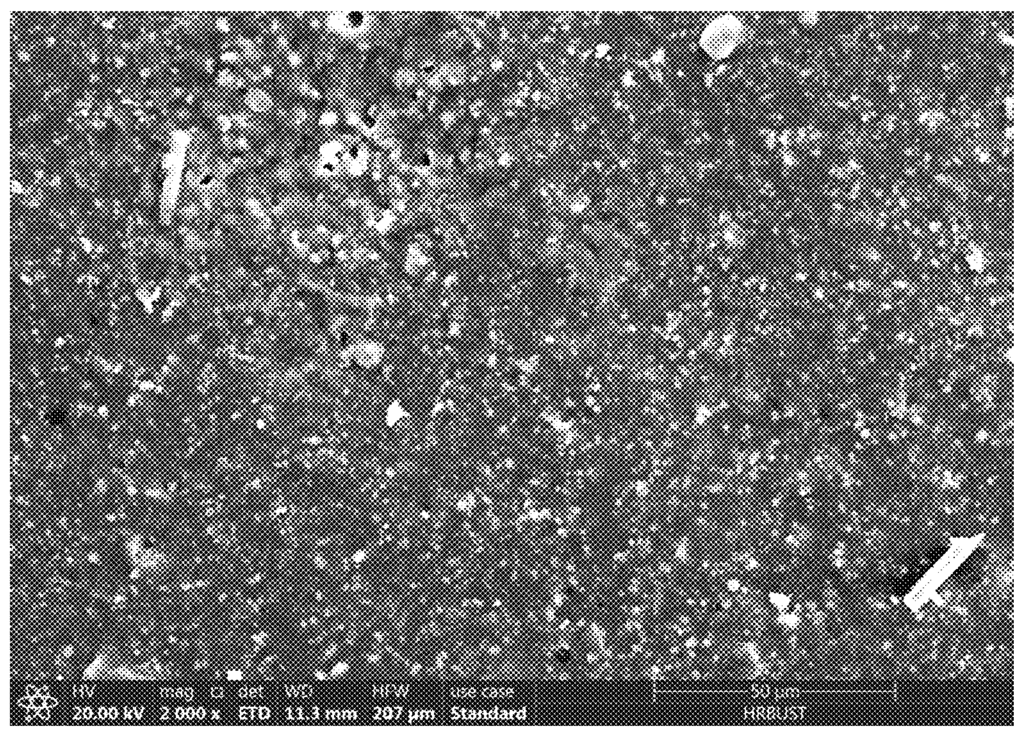
FIG. 2 shows the phosphate coating resistant to 1,800° C. for heat insulation and fireproofing prepared in Embodiment 1 in terms of surface morphology after spraying.

FIG. 2 shows the surface morphology of the phosphate coating resistant to 1,800° C. for heat insulation and fireproofing prepared in Embodiment 1 after spraying; as can be seen from the drawing, the surface of the coating is very compact and the filler is uniformly distributed, which guarantees the stable thermal insulation and fire resistant performance.

What is claimed is:

1. A phosphate coating composition resistant to 1,800 degrees Celsius for heat insulation and fireproofing, comprising: 20-30 parts by mass of aluminum dihydrogen phosphate, 10-20 parts by mass of zinc oxide, 10-20 parts by mass of cerium oxide, 5-15 parts by mass of gadolinium zirconate, 5-15 parts by mass of polysiloxane, 3-10 parts by mass of zirconium boride, 3-10 parts by mass of hafnium carbide, 3-5 parts by mass of zirconium powder, 3-5 parts by mass of tungsten powder, 10-15 parts by mass of fibers, 3-10 parts by mass of chromium trioxide, 3-10 parts by mass of potassium chromate, 0.4-1 part by mass of non-silicone defoamer, and 5-15 parts by mass of deionized water;

wherein the phosphate coating composition is prepared by a process comprising the following steps:

step 1, weighing 20-30 parts by mass of the aluminum dihydrogen phosphate, 10-20 parts by mass of the zinc oxide, 10-20 parts by mass of the cerium oxide, 5-15 parts by mass of the gadolinium zirconate, 5-15 parts by mass of the polysiloxane, 3-10 parts by mass of the zirconium boride, 3-10 parts by mass of the hafnium carbide, 3-5 parts by mass of the zirconium powder, 3-5 parts by mass of the tungsten powder, 10-15 parts by mass of the fibers, 3-10 parts by mass of the chromium trioxide, 3-10 parts by mass of the potassium chromate, 0.4-1 part by mass of the non-silicone defoamer, and 5-15 parts by mass of the deionized water;

step 2, ball milling the aluminum dihydrogen phosphate, the zinc oxide, the cerium oxide, the gadolinium zirconate, the polysiloxane, the zirconium boride, the hafnium carbide, the zirconium powder, the tungsten powder, the chromium trioxide and the potassium chromate with a ball mill in a ball mill using anhydrous ethanol as a medium, followed by drying and sieving to obtain a sieved powder;

wherein the ball milling in step 2 is performed for a duration of 500-1,200 minutes at a rotating speed of 300 to 600 revolutions per minute;

the sieving in step 2 comprises sieving powders through a 300-500 mesh sieve; and step 3, adding the sieved powder and the fibers into the deionized water, and stirring the resulting mixture under water-bath heating conditions, followed by adding the non-silicone defoamer, and stirring and heating the resulting mixture to a gel state to obtain the phosphate coating composition;

wherein a temperature for the water bath in step 3 is 85-95 degrees Celsius, and the stirring in step 3 is performed at a stirring speed of 450 to 750 revolutions per minute.

2. The phosphate coating composition according to claim 1, wherein the phosphate coating composition comprises, 20-25 parts by mass of the aluminum dihydrogen phosphate, 10-15 parts by mass of the zinc oxide, 10-15 parts by mass of the cerium oxide, 5-10 parts by mass of the gadolinium zirconate, 5-10 parts by mass of the polysiloxane, 3-5 parts by mass of the zirconium boride, 3-5 parts by mass of the hafnium carbide, 3-4 parts by mass of the zirconium powder, 3-4 parts by mass of the tungsten powder, 10-13 parts by mass of the fibers, 3-5 parts by mass of the chromium trioxide, 3-5 parts by mass of the potassium chromate, 0.4-0.5 part by mass of the non-silicone defoamer, and 5-10 parts by mass of the deionized water.

3. The phosphate coating composition according to claim 1, wherein the drying in step 2 is carried out at a temperature of 55-85 degrees Celsius for a duration of 8-24 hours.

* * * * *